Sept. 22, 1970     C. F. DE MEY, II     3,529,898

MOUNT FOR OPTICAL ATTENUATOR

Filed Aug. 28, 1967

INVENTOR.
Charles F. de Mey, II
BY
Daniel R. Levinson
ATTORNEY

United States Patent Office

3,529,898
Patented Sept. 22, 1970

3,529,898
MOUNT FOR OPTICAL ATTENUATOR
Charles Frederic de Mey II, West Redding, Conn., assignor to The Perkin-Elmer Corporation, Norwalk, Conn., a corporation of New York
Filed Aug. 28, 1967, Ser. No. 663,844
Int. Cl. G02f *1/30*
U.S. Cl. 350—271                         10 Claims

ABSTRACT OF THE DISCLOSURE

A radiant energy beam modifier (of the type which has different horizontal portions having a variable optical characteristic, such as transmissivity) is mounted by sliding point contact with a pair of stationary pins, arranged directly above and below the radiant beam center. One horizontal end of the modifier is connected by a simple pivot connection to a driving arm. Despite this simple three-point suspension, the portion of the modifier actually in the beam is precisely guided by the stationary pins, and accurately determined by the position of the drive arm.

---

This invention relates to a means for slidably mounting and movably adjusting a beam modifying element in a radiant energy beam. More particularly the invention concerns such mounting and moving means for a beam modifier having a variable optical characteristic (such as transmissivity) which varies along a linear direction of the modifier element.

In various optical instruments it is desirable to modify a radiant energy beam by introducing an element therein which changes some characteristic (such as the intensity, the spectral distribution, or even the light path direction) of the beam. In some cases this beam-modifying element continuously varies in this optical property so as to allow any degree of modification of the beam desired merely by adjusting the exact position of the element relative to the beam. Examples of such elements include continuously variable density filters, beam (intensity) attenuators, and the like. For exemplary purposes, the beam modifying elements will be assumed to be a so-called comb type of attenuator, composed of transparent and opaque parts the relative area of which varies continuously along a linear direction (say, horizontal) of the modifying element. Beam attenuators of this type are commonly used in so-called double beam optical instruments (for example, photometers, absorption spectrophotometers, and the like) of the optical null type, in which a reference beam is controllably attenuated until its intensity matches that of a sample beam, the resulting position of the calibrated attenuator being indicative of the sample beam intensity desired to be measured.

Previously such variable beam modifying elements have been slidably mounted by precise spaced (e.g., parallel) extensive tracks, which are inherently difficult to manufacture and therefore expensive. The driving means for adjustably moving the modifier in such precision tracks was also necessarily of accurate (i.e., close tolerance) manufacture to avoid binding of the highly constrained beam modifying element.

An object of the invention is the provision of an improved simplified means for adjustably mounting a variable beam modifier, which is substantially less expensive than prior mechanisms for this purpose.

A related object is the provision of such an adjustable mount and moving means, which despite its low cost precisely maintains at least that portion of the modifying element which is actually in the beam in correct position (both linear location and angular alignment).

Figure 1:
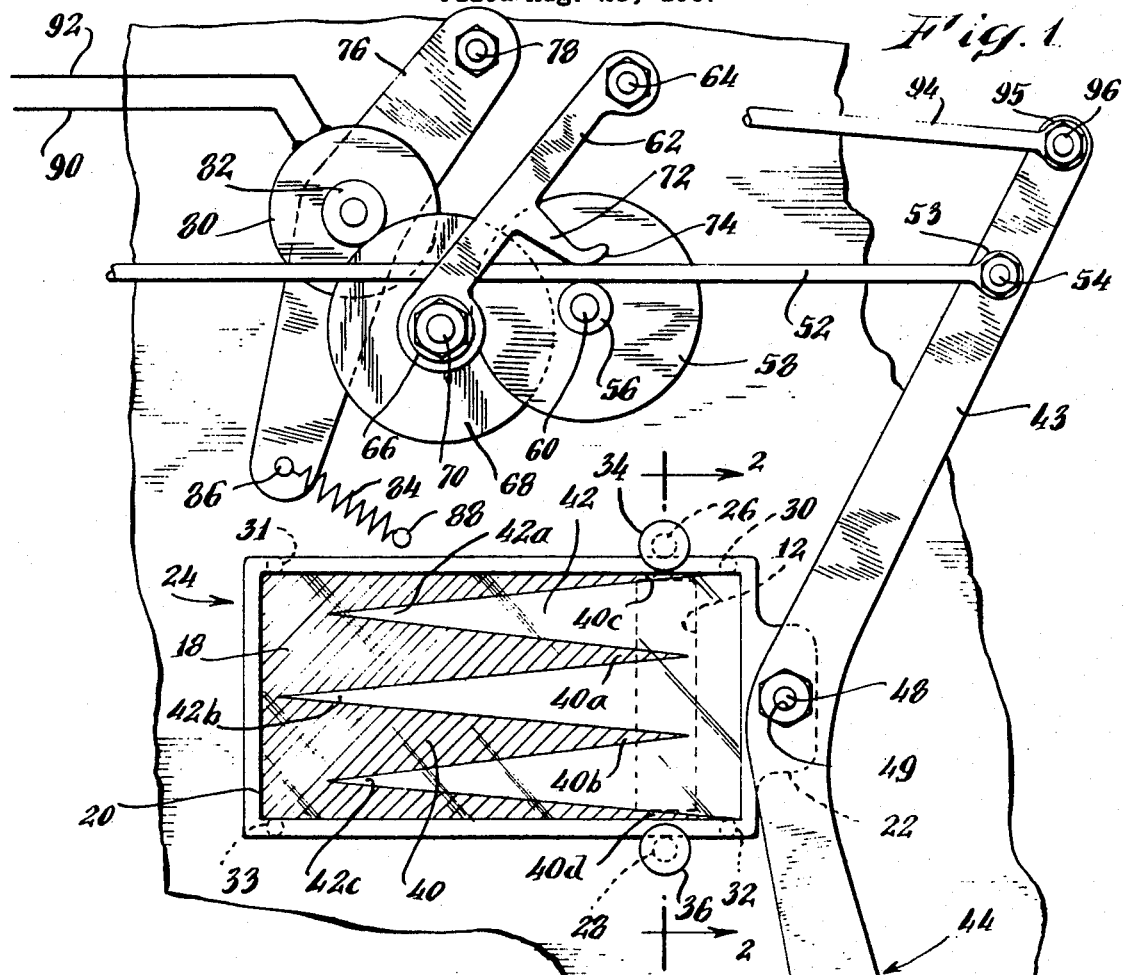
Figure 2:
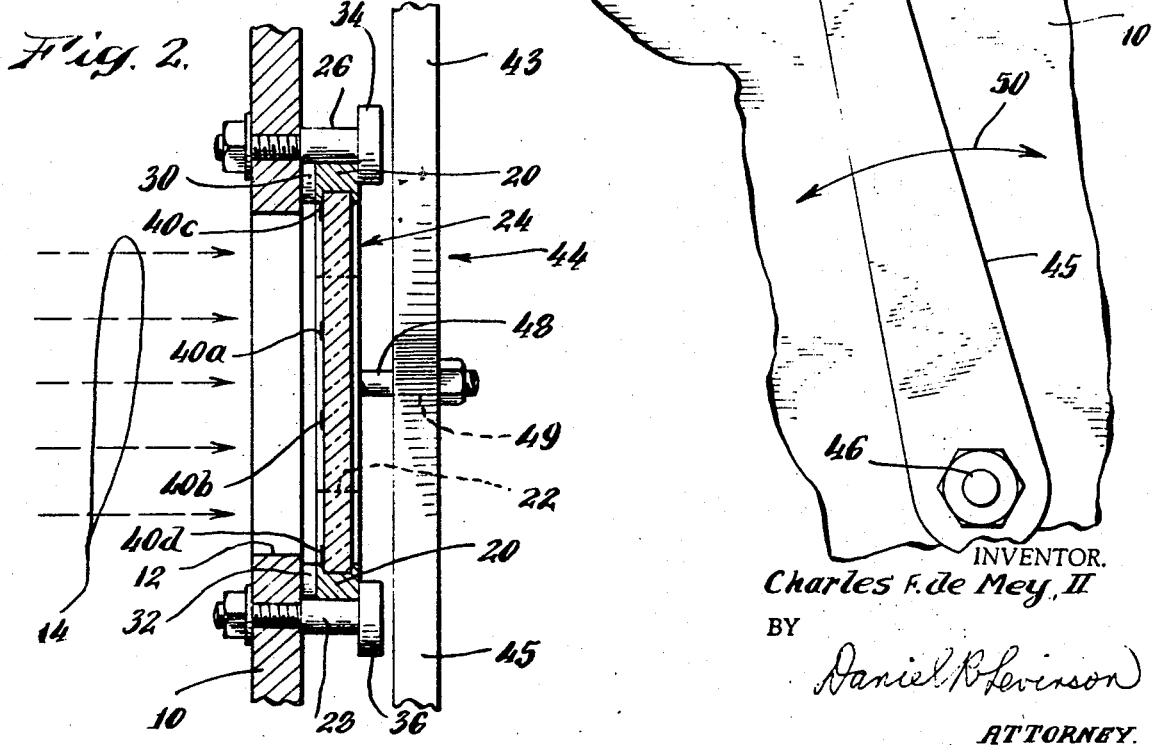

Other objects, features and advantages of the invention will be obvious from the following detailed description of an exemplary embodiment of the invention, in conjunction with the accompanying drawing, in which:

FIG. 1 is a front elevation of a beam attenuator comb slidably mounted and adjustably moved in accordance with the invention; and FIG. 2 is a vertical section, taken generally along the line 2—2 in FIG. 1.

Although as previously stated the invention may be utilized to adjustably mount and move any type of radiant energy beam modifying element, the illustrated exemplary embodiment involves a comb type of beam attenuator. Further it will be assumed for convenience that this attenuator is adjustably placed in the so-called reference or comparison beam of a double beam optical test instrument (for example, a double beam spectrophotometer) of the optical null type, in which the reference beam is controllably attenuated until its intensity matches that of a sample beam (said comparison being accomplished by a radiation detector and appropriate circuit). An example of such an optical null, double beam spectrophotometer is given in, for example, United States Pat. No. 3,039,353, issued on June 19, 1962 to Vincent J. Coates et al.

In FIGS. 1 and 2 a main interior wall or partition 10 has a hole 12 which may define or limit the cross sectional dimensions of the (reference) radiant energy beam 14. A comb type attenuator 18 (or other beam-modifying element) is rigidly mounted in a frame 20 having an ear 22 at its right-hand end, so as to form the entire beam attenuator 24. The entire beam attenuator 24 is slidably supported on main wall 10 by upper and lower pins 26, 28 respectively. Pins 26 and 28 obviously restrict the attenuator 24 from linear movement in the vertical direction in both FIGS. 1 and 2. Spacers or lugs 30, 31, 32, 33, integral with frame 20 (which may be synthetic resin, for example), and the heads 34, 36 of the pins (26, 28) also prohibit linear motion of the attenuator in the longitudinal (optical axis) direction of the beam (i.e., perpendicular to the paper in FIG. 1, and the horizontal direction in FIG. 2). This construction (i.e., elements 30–33, 34 and 36) also essentially prohibits any tilting of the attenuator 24 about any axis in (or parallel to) the plane of the paper in FIG. 1. Mounting pins 26 and 28 are preferably made of a material (for example, nylon, acetal, or "Teflon") having a relatively low coefficient of friction relative to the material of the attenuator frame 20. Similarly the material (i.e., synthetic resin, for example) of lugs 30–33 should readily slide on the material (for example, metal) of main wall 10, so that attenuator 24 may readily move in the horizontal direction in FIG. 1. Additionally, because of the substantially point contact (as viewed in FIG. 1, or the relatively short line contact as viewed in FIG. 2) with the pins, attenuator 24 is not appreciably inhibited from rotation about horizontal axes perpendicular to the plane of the paper in FIG. 1.

The attenuator element 18 may consist of opaque areas 40 and transparent areas 42 of such geometric shape that the percentage of the radiation beam at slit 22 intercepted by the opaque areas continually increases as attenuator 24 is moved to the right in FIG. 1. Attenuator "combs" of this type are known, and may be made by cutting a single piece of opaque (e.g., metal) material or by making selective areas in originally transparent material (e.g., glass) opaque. It will be assumed that the opaque and transparent areas of the particular exemplary attentuator comb 18 are of such shape that the opaque area intercepting the beam linearly varies in area from zero to 100% relative to horizontal movement of the attenuator from right to left in FIG 1. The exemplary moving means for the attenuator comprises an elongated lever 44, pivotally mounted at its lower end by any conventional means 46 to wall 10, and attached near its center to attenuator 24, for example, by a round pin 48 rigid with ear 22 entering into a conforming hole 49 in lever 44. Rotative motion of lever 44 about pivot 46 (as indicated by arrow 50) will therefore slide the attenuator 24 between pins 26 and 28 to position any desired relative area of opaque and transparent portions (40, 42) in the beam passing through slit aperture 22. Such pivoting motion may be imparted to lever 44 by a push rod 52, connected, as by an eyelet 53, to pin 54 rigidly attached to an upper angled portion 43 of arm 44.

Push rod 52 is frictionally engaged by a relatively small drive roller portion 56 rigidly attached to a larger driven roller 58, rotatively mounted about a pivot 60 affixed to wall 10. A support bracket 62 is pivotally suspended at 64. A small drive roller 66 and a large driven roller 68 (rigidly connected to each other) are rotatably mounted as a unit on axle 70 near the lower end of bracket 62. A resilient arm or finger 72 of the bracket is flexed by pressure contact at 74 with the upper surface of push rod 52 immediately above the point of contact between this rod and small drive roller portion 56. Since arm 72 is integral with (or at least rigidly attached to) bracket 62, the spring tension of arm 72 also biases small drive roller 66 against the periphery of large driven roller 58. The geometry of arm 72 is so chosen that when rollers 66 and 58 are in firm contact, there is a residual strain in arm 72 at point 74; thus the spring tension of arm 72 acts both to hold push rod 52 in operative engagement with small drive roller 56 and at the same time assures driving connection between rollers 66 and 58. Motor bracket 76 is pivotally supported by pin 78 on wall 10, and rigidly carries motor 80, the rotating output drive roller 82 of which frictionally engages the periphery of driven roller 68. Spring tension biasing motor brackets counterclockwise about pivot 78 (and therefore motor output roller 82 against roller 68) may be provided by tension spring 84 having its respective ends attached to the motor bracket at 86 and to the main wall at 88. The electrical input to motor 80 may be provided over input leads 90, 92.

An indicating rod 94 may be attached to the upper end of lever 44, for example, by a pin 96 (rigid relative to the lever) passing through an "eye" 95 formed in the right-hand end of the rod 94. Indicating rod 94 will therefore move linearly along its own length in exact proportion to the linear movement of the attenuator 24. In the exemplary embodiment (FIG. 1), lever 44 is "bent" so as to have an upper portion 43 angled relative to the lower portion (45). Indicating rod 94 is therefore driven generally in a direction perpendicular to the line joining pivot axis 46 and pivot axis 96 (rather than perpendicular to either upper portion 43 or the lower portion 45 of the lever 44). Thus, indicator rod 94 need not be driven parallel to the beam-modifying assembly 24 in order to move in a directly proportional manner. Specifically, if both assembly 24 and indicating rod 94 make the same initial angle relative to their own effective lever arm (i.e., the line joining pivot 46 and pin 48, and the line joining pivot 46 and pin 96, respectively) as shown in FIG. 1, they will move in exactly the same manner if the additional mechanical restraints thereon are also similar. In fact, over any relatively small arc of movement of the lever 44, assembly 24 and indicator rod 94 will move a distance proportional to, and in a direction perpendicular to, their effective lever arms (i.e., the two above-mentioned lines joining the two pairs of pivots) even if the additional mechanical restraints on elements 24 and 94 are not exactly analogous. The left-hand end (not shown) of rod 94 may therefore be directly coupled to any convenient indicating or recording means (which moves generally in straight line) to provide a direct readout of the beam attenuator position; for example, rod 94 may be directly attached to the pen assembly of a chart recorder so as to directly determine one coordinate of the pen position.

If the attenuating element 18 is so formed that the percent transmission of beam 14 (i.e., the percent of the area of the slit 12 covered by the opaque portion 40 of element 18) varies linearly with the horizontal movement of attenuator 24, then the position of rod 94 will also be in a directly linear relationship with the percent of attenuation. Thus in optical null instruments (for example, certain types of double beam spectrophotometers) rod 94 will give a direct indication of the percentage of attenuation of reference beam 14 necessary to make it of equal intensity to the sample beam. It may therefore be used to move a recorder pen (or any other type of indicator) so as to yield a direct indication of the sample beam intensity. For example, in a double beam absorption spectrophotometer, the position of the indicator attached to rod 94 will directly yield the percentage of transmittance of the sample (or if the percentage scale is inverted, the percentage of absorption by the sample).

Since economy is a primary goal of the invention, it should be noted that not only pins 26 and 28 and frame 20 may be formed from synthetic resin by inexpensive molding techniques, but also the composite driven-drive roller 58, 60, the similar double roller 66, 68, and even bracket 62 may be similarly formed from suitable synthetic resins. In fact support bracket 62 has been successfully made of a single piece of synthetic resin of the general shape indicated in FIG. 1, so that integral arm 72 has the natural resiliency to perform its above-noted desired biasing function. Rods 52 and 94 may consist of inexpensive commercially available metallic stock. Since the only requirement of precision is that the rod 94 correctly indicate the relative position of the attenuator or other beam modifying element 18, 24 in the beam 14, only the parts directly connecting these elements need be free of backlash or other imprecision. Thus assuming that lever 44 is sufficiently rigid, only its pivot 46, its connection to the beam attenuator at 48, 49 and its connection to rod 94 at 95, 96 need be precise, in order for the device to give an accurate indication of the position (and therefore the effect) of the attenuator or other beam modifying element 18.

The operation of the disclosed embodiment as utilized in, say, a double beam absorption spectrophotometer is as follows. The detector system of the spectrophotometer (see for example elements 32–35 in U.S. Pat. No. 3,039,353) will supply an electrical signal to leads 90, 92. This signal will be zero when the sample beam and the reference beam (as attenuated by the present position of attenuating element 18) are equal, but will have a non-zero amplitude for all other conditions. Further it will vary in some determinable characteristic (such as polarity) depending on whether the detector "sees" a more intense sample beam or a more intense attenuated reference beam. It may be noted that this detector output signal need not be directly proportional to (or indeed any simple function of) the difference in intensity between the sample and reference beam, since the attenuator position itself "closes the control loop." Let it be assumed that the attenuated reference beam 14 is brighter than the sample beam when the attenuator is in the position shown in FIG. 1. Then there will be a non-zero signal of correct characteristic (e.g., polarity) to drive motor 80 so that its output roller 82 drives large intermediate roller 68 and therefore rigidly attached small drive roller 66, which in turn drives the large second roller 58 and its rigidly attached small drive roller 56. Small drive roller 56 therefore rotates in the correct direction (in this case clockwise) to drive push rod 52 (to the right), thereby rotating lever 44 in the correct (clockwise) direction about its pivot 46 to move attenuator 24 to the right. When the attenuator slide 24 (and therefore the attenuating element 18) has been driven sufficiently to the right to diminish the intensity of the reference beam to that of the sample beam, the detector output signal will approach and finally reach zero. Motor 80 will therefore cease to rotate and the attenuator will remain in the new position until there has been a change in intensity of the sample beam once again. In some situations the sample beam as "seen" by the detector may almost continually change in intensity (as for example in a scanning spectrophotometer where the wavelength of the radiation measured, and therefore the percent absorption of the sample, varies continuously); then the attenuator 24 will be almost continuously driven from one position to another so as to compensate the intensity of the reference beam to equal that of the sample.

Since in such optical null double beam balancing systems it is the attenuator position that determines the balance, relatively large amounts of imprecision may be tolerated in not only the mechanical parts numbered 52 through 88 but also much of the detector system (not shown). For example slippage in any of the driving connection between elements 52 through 82 do not affect the final position to which the attenuator will be driven (but only the speed of response and the like). Although the immediate mounting means (i.e., pins 26 and 28) for the beam attenuator 24 are extremely simple and inexpensive, nevertheless they highly constrain that part of the beam attenuator 24 (and therefore attenuating element 18) that is actually in the beam (i.e., directly in front of aperture slit 12). Although the attenuator is constrained in at least two angular and two linear directions as indicated earlier in the specification, the mounting means does allow the small amount of tilt of the attenuator (about an axis perpendicular to the plane of the paper in FIG. 1 and midway between pins 26 and 28) during operation, caused by the arcuate path of pin connection 48, 49 about the pivot axis 46 of lever 44.

The relative great length of lever 44 (between elements 46 and 49), the fact that the actual pivot axis of the attenuator 24 is both vertically and horizontally centered in the used part of the beam, and the general symmetry of the attenuator element 18 (about its horizontal midline) diminish the extent and effect, respectively, of such attenuator tilt. Specifically the large radius of the arcs made by (hole 49 and therefore) pin 48 causes it to deviate from the ideal horizontal straight line by only a small amount. The practical effect of the undesirable angular deviation of the attenuator 24, 18 may be further reduced by insuring that the attenuator element 18 is horizontal when the part in the beam is in the vicinity of its 0% transmission (i.e., when the attenuator is in its left-most position as seen in FIG. 1.). This relationship minimizes the proportional error at the most critical attenuator position. For example, a moderate amount of undesired canting of attenuator element 18 when it is nominally transmitting, say, 1% might cause it to actually transmit 1½%, a relative error of 50%. Obviously a similar absolute error of ½% is much less serious at, say, mid-scale (i.e., the same ½% error being a 1% relative error for normal transmittance values of around 50%). If the pivot axis 46 of the lever 44 is placed as shown, the lower lever portion 45 will be tilted by the same amount (but in the opposite sense) when the attenuator is in either its extreme leftward (100% transmission) or rightward (0% transmission) position. If the lever length is chosen to be "correct" (i.e., so as to cause no attenuator tilt) for these positions, the effective lever length will be slightly "too long" at intermediate positions. This will cause the pin 48 to be raised slightly during mid-values of transmission (with the maximum deviation occurring around the 50% transmission value) so as to cause a slight counterclockwise (as seen in FIG. 1) tilt of the attenuator. However, the almost symmetrical nature of element 18 causes at least partial self-compensation of the adverse effect of such attenuator tilt. For example if the attenuator tilts slightly counterclockwise about the longitudinal center line of slit 12, somewhat more of lower opaque area 40b will be introduced into the beam, while a certain amount of upper opaque area 40a will be withdrawn from the beam. Although these areas are not necessarily equal (because of the taper of opaque areas 40a and 40b), they will be very close to equal for all practical cases (i.e., when the taper is moderate and the tilt is small).

The center transparent area 42b is shown as terminating somewhat to the left of the upper and lower transparant areas (42a and 42c, respectively). This construction reduces the manufacturing tolerances, for example, in cutting a very sharp tapering opening "point" at the left-hand edge of an opaque plate (40). In fact all three transparent areas may terminate at different left-hand points to reduce further the criticality of their having truly sharp points (as is actually the case in existing prototypes on which a commercial instrument is being based). Such partial lack of symmetry can actually be used to enhance the compensation for the very slight tilt mentioned just above. Thus, the opaque edge areas 40c and 40d, for example, may be made intentionally nonsymmetrical to each other so as to cause substantially equal areas thereof to be introduced and withdrawn from the beam, when the attenuator is tilted slightly (counterclockwise) as noted above. In any event, the actual tilt is so small for a relatively long effective lever arm (i.e., lever portion 45) used only over a moderate lever tilt that the effect is essentially negligible, at least in the area of the attenuator actually used (i.e., between pins 26 and 28).

Since the indicating rod 94 is rigidly attached to the same lever 44 which moves the attenuator, the fact that the linear horizontal position of attenuator 24 is trigonometrically related to the angular position of lever arm 44 is exactly compensated by the same trigonometric relationship between indicator rod 94 and the lever. Stated in other terms, the linear motion of indicator rod 94 will always be exactly proportional to the linear motion of attenuator 24 despite the pivotal nature of the movement of lever arm 44. Thus the illustrated embodiment of the invention provides an exact indication of the linear position of element 18 despite the relative simplicity (and economy) of the mounting and moving means for the beam modifying element 18.

Although the invention has been disclosed as embodied in a mounting and moving means for an optical attenuator, and its operation explained on the assumption that it was used in the reference beam of a spectrophotometer (and more particularly a double beam absorption spectrophotometer of the optical null type), it is obviously not restricted to such use. Not only may the invention be utilized to mount and variably position an attenuator in any type of optical instrument, but indeed it may be used to so movably position other types of beam modifying elements in any radiation path. Further, it will be obvious to one skilled in the art that many modifications may be made in the various exemplary elements and exact relationships shown and described. For this reason the invention is not limited to any specific use or any of the deails specifically disclosed, except as explicitly required by the following appended claims.

What is claimed is:

1. An apparatus for adjustably modifying a radiant energy beam comprising:

an elongated generally rectangular beam modifying assembly of the type having portions exhibiting a varying optical characteristic along its length;

a pair of stationary mounting means, each movably supporting an opposite long edge of said beam modifying assembly, each of said mounting means being of such construction and being in such operative relationship to said beam modifying assembly as to contact each of said long edges thereof at substantially a single point as viewed in the direction of said radiant energy beam, each of said contact points being substantially on the transverse center line through said radiant beam;

and moving means operatively connected at a single point to said beam modifying assembly to move said beam modifying assembly in a particular direction, stantially perpendicular to said beam transverse center line;

whereby said different modifying assembly portions having varying optical characteristics may be adjustably moved into operative position in said radiant beam, while solely said mounting means constrains at least the operative portion of said assembly, which is intercepted by said radiant beam, from both linear and angular misalignment.

2. An adjustable radiant energy beam modifying apparatus according to claim 1, in which:

said beam modifying assembly portions are of such construction as to be of varying radiation transmissivity whereby said apparatus acts as a variable radiant beam intensity attenuator.

3. An adjustable, radiant energy beam modifying apparatus according to claim 2, in which:

each successive portion of said beam modifying assembly, in said particular direction, is of decreasing radiation transmissivity, whereby said assembly acts as a radiant energy intensity attenuator.

4. An adjustable, radiant energy beam modifying apparatus according to claim 3, in which:

said successive portions decrease in transmissivity in a substantially linear manner, whereby the percentage of the radiant energy beam transmitted by said beam attenuating assembly is substantially directly proportional to the position of said element in said particular direction.

5. An adjustable, radiant energy beam modifying apparatus according claim 4, in which:

an indicating connection means is directly connected to a part of said moving means which moves in direct relationship to said beam modifying assembly, whereby a linearly reading indicator may be directly driven by said indicating connection means.

6. An adjustable, radiant energy beam modifying apparatus according to claim 1, in which:

said moving means comprises a long pivotally mounted lever, connected to said beam modifying assembly at a point remote from the pivot axis of said lever, and said moving means further comprises a simple motor-driven push rod for pivoting said lever and therefore moving said beam modifying assembly in said particular direction.

7. An adjustable, radiant energy beam modifying apparatus according to claim 6, in which:

an indicating rod is directly connected to said long lever at a second point also remote from said lever pivot axis, whereby said indicating rod moves in a manner directly proportional to said beam modifying assembly movement.

8. An adjustable, radiant energy beam modifying apparatus according to claim 1, in which:

each of said pair of stationary supporting means comprises a support pin, having a surface directly frictionally engaging the adjacent long edge of said beam modifying assembly, whereby a simple, inexpensive constraint of at least said operative portion of said beam modifying assembly is obtained.

9. An adjustable, radiant energy beam modifying apparatus according to claim 8, in which:

at least said surface of said support pins and the directly frictionally engaged long edges of said beam modifying assembly are of such material as to have a low mutual coefficient of friction.

10. An adjustable, radiant energy beam modifying apparatus according to claim 1, in which:

each of said pair of stationary supporting means comprises a part overlying said adjacent long edge of said beam modifying assembly.

whereby said beam modifying assembly is constrained from undesired movement in a direction generally along the axis of said radiant energy beam.

References Cited
UNITED STATES PATENTS

| | | | |
|---|---|---|---|
| 2,186,203 | 1/1940 | Centeno | 350—272 |
| 3,013,470 | 12/1961 | Pliskin | 350—266 |
| 3,205,767 | 9/1965 | Weber et al. | 350—314 |
| 3,347,616 | 10/1967 | Mori et al. | 350—271 |

RONALD L. WIBERT, Primary Examiner

O. B. CHEW II, Assistant Examiner